US005691402A

United States Patent [19]

Anders

[11] Patent Number: 5,691,402
[45] Date of Patent: Nov. 25, 1997

[54] COMPOSITE TOOLING MATERIAL HAVING VINYL ESTER RESINS AND FILLERS

[75] Inventor: Richard M. Anders, Cassopolis, Mich.

[73] Assignee: Composite Technology Group, LLC, Cassopolis, Mich.

[21] Appl. No.: 713,930

[22] Filed: Sep. 13, 1996

[51] Int. Cl.$^6$ .............................. C08K 5/00; A01J 21/00; B32B 9/00

[52] U.S. Cl. ..................... 523/515; 523/515; 523/516; 264/225; 428/337; 428/339; 425/403; 425/470; 76/107.1

[58] Field of Search ..................... 523/515, 516; 264/225; 428/337, 339; 425/403, 470; 76/107.1

[56] References Cited

U.S. PATENT DOCUMENTS

| | | | |
|---|---|---|---|
| 2,822,448 | 2/1958 | Wegmann | 218/150 |
| 3,231,341 | 1/1966 | Sump et al. | 442/377 |
| 3,464,854 | 9/1969 | Bolger | 427/386 |
| 3,645,899 | 2/1972 | Linson | 174/165 |
| 3,838,094 | 9/1974 | Sporck | 523/213 |
| 3,904,555 | 9/1975 | Matsuda et al. | 252/503 |
| 4,038,444 | 7/1977 | Steinhauser et al. | 427/261 |
| 4,102,851 | 7/1978 | Luck et al. | 523/457 |
| 4,125,351 | 11/1978 | Alfter et al. | 425/403 |
| 4,287,115 | 9/1981 | Legler | 523/443 |
| 4,307,147 | 12/1981 | Ohishi et al. | 442/237 |
| 4,356,233 | 10/1982 | Lange et al. | 428/336 |
| 4,366,185 | 12/1982 | Tanaka et al. | 427/386 |
| 4,375,498 | 3/1983 | Le Minez et al. | 428/416 |
| 4,423,094 | 12/1983 | Dearlove et al. | 427/386 |
| 4,459,335 | 7/1984 | Tanaka et al. | 428/323 |
| 4,528,305 | 7/1985 | Henry | 523/219 |
| 4,533,685 | 8/1985 | Hudgin et al. | 523/457 |
| 4,546,674 | 10/1985 | Clark et al. | 76/107.1 |
| 4,654,382 | 3/1987 | Hiza et al. | 523/457 |
| 4,670,485 | 6/1987 | Hesse et al. | 523/436 |
| 4,681,904 | 7/1987 | Yasuda et al. | 523/457 |
| 4,732,962 | 3/1988 | Atkins et al. | 528/94 |
| 4,830,779 | 5/1989 | Maeno et al. | 252/512 |
| 4,859,528 | 8/1989 | Lee et al. | 442/180 |
| 4,920,161 | 4/1990 | Wang et al. | 264/225 |
| 4,925,886 | 5/1990 | Atkins et al. | 523/443 |
| 4,980,112 | 12/1990 | Masters | 264/225 |
| 5,053,476 | 10/1991 | Akutagawa et al. | 528/103 |
| 5,057,256 | 10/1991 | Gorin | 264/113 |
| 5,073,589 | 12/1991 | Milovich et al. | 524/439 |
| 5,096,762 | 3/1992 | Yoshida et al. | 428/76 |
| 5,202,753 | 4/1993 | Shintai | 257/787 |
| 5,281,634 | 1/1994 | Hesse et al. | 523/514 |
| 5,298,548 | 3/1994 | Shiobara et al. | 523/443 |
| 5,319,003 | 6/1994 | Gomez et al. | 523/222 |
| 5,470,651 | 11/1995 | Milinkovic et al. | 428/325 |

*Primary Examiner*—Samuel A. Acquah
*Attorney, Agent, or Firm*—Quarles & Brady

[57] ABSTRACT

A vinyl ester resin/filler composite is disclosed which has a glass transition temperature of at least 315° C. when cured. One version of the composite includes tabular alumina as a filler. Another version of the composite includes a powdered base nickel alloy as a filler. The composite is especially advantageous when used to build tools for use in plastic molding machines and processes.

21 Claims, No Drawings

COMPOSITE TOOLING MATERIAL HAVING VINYL ESTER RESINS AND FILLERS

FIELD OF THE INVENTION

The present invention generally relates to a high temperature vinyl ester resin tooling composition which can be used as an injection molding and sheet molding compound (SMC) for molding of plastic materials. More particularly, it is concerned with a dimensionally stable, high temperature vinyl ester resin composition for making tools which are capable of withstanding mold temperatures of at least 315° C.

BACKGROUND OF THE INVENTION

Injection molding tools and SMC molding tools traditionally have been made of high strength tool steel because of its rigidity and durability. In the automotive industry, molds made of tool steel have been used to injection or compression mold automobile parts made of either thermoplastic or thermoset plastic materials. However, these steel molds are very costly due to the extensive machining required to make them. Aluminum can also be used to make hard tools but such tools also suffer from the same disadvantages as steel.

It is a common practice in the automotive industry that before a new vehicle having a new body style is put in production, a limited number of concept or prototype vehicles are first built for testing. Designing hard forming tools (using aluminum or tool steel) for molding plastic parts used in these prototype vehicles would not be practical for several reasons. First, a prototype vehicle has to be built in a relatively short time which prohibits the use of hard materials for forming tools due to the extensive machining required. Secondly, the design of a prototype car is changed many times from the original design before it reaches a final production model. This means that many forming tools will have to be built before the design of a specific part is finalized. This makes the building of a hard forming tool prohibitive for cost reasons.

One method of making prototype forming tools is by using a zinc alloy material called Kirksite. Even though a Kirksite tool is more economical to make because of the lower cost of the material, a Kirksite tool still requires the use of a foundry as well as extensive machining to obtain the desired contour and close match between the tool halves. Furthermore, a Kirksite tool is extremely heavy and very difficult to handle.

In recent years, there has been a renewed effort to develop polymeric materials to make durable forming tools. Commonly, one material used is epoxy resin. For example, U.S. Pat. Nos. 4,732,962; 4,920,161; and 4,925,886 (all of which are incorporated by reference as if fully set forth herein) disclose epoxy composite materials for use in making tooling. While epoxy resin composite materials exhibit good mechanical strength for tooling purposes, most can only be used at mold temperatures of less than 400° F. (205° C.). This temperature limitation restricts the use of epoxy resins in many molding applications. For a discussion of thermoset resins see, for example, H. Lee, et al., *Handbook of Epoxy Resins*, McGraw-Hill, Inc. (1967).

Another drawback of many epoxy resin composite materials is that many require an extensive curing period at room temperature or else a curing period at an elevated temperature. The major problems encountered in forming an epoxy resin tool are severe shrinkage and dimensional distortion which leads to unacceptable warpage of the tool. These problems are generally caused by the extreme heat generated by the exothermic curing process. Since the curing process proceeds very rapidly, the amount of exothermic heat accumulated in a bulk section of epoxy tooling cannot be rapidly dissipated by heat transfer due to the low thermoconductivity of epoxy resin. This large amount of exothermic heat causes the formation of localized heat pockets and thermal shocks which lead to shrinkage, cracking, and dimensional distortions.

Therefore, a composite tooling material which avoids the above drawbacks of the prior art would be desirable.

SUMMARY OF THE INVENTION

The present invention provides a durable, high temperature tooling composition comprising vinyl ester resin, a filler system of particulate fillers, a promoter, and a catalyst, wherein said composition has a $T_g$ of at least 315° C. when cured. In one aspect of the invention the filler system can comprise tabular alumina. Most preferably, this aspect of the invention comprises about 1 part w/w vinyl ester resin and about 3.5 parts w/w tabular alumina.

Another aspect of the present invention provides a composition of the above kind but with a filler system comprising a base nickel alloy and fumed silica. In this aspect of the invention, the composition most preferably has about 1 part w/w vinyl ester resin, 4 parts w/w base nickel alloy, and about 10% w/w fumed silica. Preferably, the base nickel alloy comprises chromium, manganese, and vanadium. The base nickel alloy can also further comprise carbon, cobalt, iron, molybdenum, silicon, and tungsten. Most preferably, the nickel is about 53.16% w/w, the carbon is about 0.02% w/w, the cobalt is about 0.44% w/w, the chromium is about 16.79% w/w, the iron is about 6.24% w/w, the manganese is about 0.69% w/w, the molybdenum is about 16.97% w/w, the silicon is about 0.74% w/w, the tungsten is about 4.65% w/w, and the vanadium is about 0.30% w/w.

Another aspect of the invention provides a durable, high temperature molding tool having a resin/tabular aluminum composition of the above kind.

A still further aspect of the invention provides a durable, high temperature molding tool comprising a surface layer having a composition of resin/base nickel alloy/cavisol of the above kind.

A still further aspect of the invention provides a durable, high temperature molding tool comprising a surface layer having a composition of the above specific percentages.

Yet another aspect of the present invention provides a durable, high temperature tool comprising a surface layer having a composition of resin/base nickel alloy of the above kind and a backer layer having a second composition of about 1 part w/w vinyl ester resin, about 3.5 parts w/w tabular alumina, a promoter, and a catalyst, wherein said second composition has a $T_g$ of at least 315° C. when cured.

Another aspect of the present invention provides an improved process for molding plastic parts, wherein the improvement comprises forming the part using molding tools of the above kind.

Yet another aspect of the present invention provides an improved apparatus for molding plastic parts, wherein the improvement comprises a mold cavity having tools of the above kind.

It is therefore an object of the present invention to provide a tooling composition that has high compressive strength and high tensile strength sufficient for making durable tools for molding processes.

It is another object of the present invention to provide a tooling composition that can be rapidly cured at room temperature in less than 24 hours without dimensional distortion.

It is yet another object of the present invention to provide a tooling composition that can withstand mold temperatures of at least 315° C.

Other objects, features, and advantages of the present invention will become apparent upon consideration of the description that follows.

DETAILED DESCRIPTION OF THE INVENTION

The present invention provides a composite tooling material having a unique vinyl ester resin and fillers. For most applications, the tool composition comprises a single relatively thick "backer" layer. However, in some applications a smooth "surface" layer is required if the manufactured part demands it. In this case, a relatively thin surface layer is provided on the thicker "backer" layer mentioned above. The combination of the unique vinyl ester resin and filler materials provide composites having surprising and unexpected properties which are especially advantageous in tooling applications.

Vinyl ester resins are well known. For a detailed discussion of vinyl ester resins, also called epoxide acrylates, see U.S. Pat. No. 5,281,634 which is incorporated by reference as if fully set forth herein.

The vinyl ester resin of the present invention preferably has no styrene added to it. The preferred vinyl ester resin of the present invention is a reaction product between methacrylic acid and a polyepoxide. The preferred resin of the present invention can be obtained from Top-Tech, Inc., 25208 River Road, Marengo, Ill. The viscosity of the preferred vinyl ester resin is about 2500 centipoise and has a clear, pale to yellow appearance. The preferred resin utilizes about 20% by weight hydroxyethylmethacrylate monomer and has a gel time at room temperature of about 45–60 minutes utilizing 1.25% by weight methylethylketone peroxide as a catalyst. The glass transition temperature ($T_g$) for the preferred resin is at least 315° C. and preferably in excess of 400° C. (which is also the glass transition temperature of the resin/filler composites).

The preferred resin also contains a cobalt salt promoter which can be cobalt naphthanate or any other equivalent cobalt salt. In the preferred vinyl resin, the cobalt salt comprises 12% by weight cobalt. Promoters for vinyl ester resin composites of the present invention may also include, for example, Co, Mn, Sn, or Ce salts of organic acids, or amines, such as N,N-dimethylaniline or N,N-diethylaniline.

If the molding application demands it, a unique surface layer is provided by the present invention. The surface layer of the present invention provides the tool surface with a high gloss, tight surface which leads to better mold release characteristics for the plastic part. Using such a surface layer is especially advantageous in injection molding, SMC molding, DCP molding, and in molding processes which demand a plastic surface having a more aesthetic (classy) appearance.

The surface layer comprises a base nickel alloy, vinyl ester resin, and fumed silica. By a base nickel alloy I mean an alloy having at least 50% w/w nickel. Preferably, the ratio of base nickel alloy to vinyl ester resin is at least 2.5:1 w/w but not more than 8:1 w/w. It is also preferred that fumed silica be at least 5% w/w but not more than 20% w/w of the composite.

The surface layer most preferably comprises about four parts of a base nickel alloy, about one part of vinyl ester resin and about 10% fumed silica (e.g., CAB-O-SIL which is available from Cabot Corp., Tuscola, Ill.). Preferably, the base nickel alloy is powdered and passes through a 325 mesh.

The base nickel alloy advantageously contains cobalt, carbon, chromium, molybdenum, iron, silicon, vanadium, manganese, and tungsten. However, carbon, cobalt, iron, molybdenum, silicon, and tungsten may be eliminated without adversely affecting the properties of the surface layer. Most preferably, the nickel base alloy has about 0.02% w/w carbon, 0.44% w/w cobalt, 16.79% w/w chromium, 6.24% w/w iron, 0.69% w/w manganese, 16.97% w/w molybdenum, 0.74% w/w silicon, 4.65% w/w tungsten, 0.3% w/w vanadium, and 53.16% w/w nickel.

The preferred powdered nickel base alloy is available from Stellite Coatings, 1201 Eisenhower Drive, Goshen, Ind. This powdered base nickel alloy has a Hall flow of 12.4 seconds and an approximate density of 5 g per cc. It is preferred that the base nickel alloy not exceed 90 on the Rockwell B scale.

To form the surface layer, one mixes the base nickel alloy and fumed silica with the resin. When one is ready to make the surface layer, 1–2% by weight (based on the resin) of methyethylketone peroxide catalyst is added to the mixture. The mixture is then sprayed, brushed, or casted into the pattern and is allowed to air cure. The thickness of the surface layer should generally be at least 20 mils.

If a surface layer is used, the next step is to form a backer layer. Alternatively, a backer layer may be used alone if the particular molding application does not dictate the use of a surface layer. The backer layer comprises tabular alumina and vinyl ester resin. Preferably, the tabular alumina is at least about 70% w/w and no more than about 90% w/w of the composite.

The backer layer most preferably comprises about 1 part vinyl ester resin and about 3.5 parts of a filler of tabular alumina. The preferred vinyl ester resin is as described above. Preferably, the tabular alumina is in a powder form and passes through a 325 size mesh. The tabular alumina should preferably be 99.8% w/w pure α-alumina but no less than 90% w/w α-alumina. The backer layer may be made as thick as necessary to meet the requirements of the particular molding application. Generally, the backer layer is about one-half inch to 12 inches in thickness.

Other materials will also function as acceptable fillers as long as they are porous and have an irregular geometry (i.e., crystals would not work). For example, powdered aluminum; nitrates of aluminum, boron, and titanium; β-alumina; and steel shavings would all function as acceptable fillers in the present invention.

To form the backer layer, the tabular alumina (or other filler) is mixed with the vinyl ester resin (preferably in a shear mixer). When one is ready to make the backer layer, methylethylketone peroxide catalyst ( 1–2% w/w based on resin for laminate tools) or hydrogen peroxide catalyst (1–2% % w/w based on resin for cast tools) is added to the mixture. The mixture is then applied over the surface layer and air cured. The backer layer may be any desired thickness, but for thicker backers a fiberglass reinforced laminate structure is preferably used.

Tables 1–4 below show some key structural properties of the composites of the present invention. For comparison purposes, one can convert psi to MPa by using 0.006895 as a multiplier.

TABLE 1

Properties of Vinyl Ester Resin and Fiberglass (no filler)

| ASTM D638 | |
|---|---|
| Mean Tensile Strength (psi) | 15,170 |
| Mean Tensile Modulus (psi) | 1,758,000 |
| ASTM D695 | |
| Mean Compressive Strength (psi) | 12,190 |
| Mean Compressive Modulus (psi) | 782,000 |
| ASTM D790 | |
| Mean Flexural Strength (psi) | 27,190 |
| Mean Flexural Modulus (psi) | 1,290,000 |
| Glass Transition Temperature | ~430° C. |

TABLE 2

Properties of Cast Backer Material

| ASTM D638 | |
|---|---|
| Mean Tensile Strength (psi) | ~2,350 |
| Mean Tensile Modulus (psi) | ~2,010,000 |
| ASTM D695 | |
| Mean Compressive Strength (psi) | 29,470 |
| Mean Compressive Modulus (psi) | 766,000 |
| ASTM D790 | |
| Mean Flexural Strength (psi) | 8,726 |
| Mean Flexural Modulus (psi) | 2,397,000 |
| Glass Transition Temperature | ~430° C. |

TABLE 3

Properties of Laminate Backer Material

| ASTM D638 | |
|---|---|
| Mean Tensile Strength (psi) | 20,650 |
| Mean Tensile Modulus (psi) | 1,923,000 |
| ASTM D695 | |
| Mean Compressive Strength (psi) | 34,250 |
| Mean Compressive Modulus (psi) | 808,000 |
| ASTM D790 | |
| Mean Flexural Strength (psi) | 8,222 |
| Mean Flexural Modulus (psi) | 2,058,000 |
| Glass Transition Temperature | ~430° C. |

TABLE 4

Properties of Surface Layer

| ASTM D638 | |
|---|---|
| Mean Tensile Strength (psi) | 2,367 |
| Mean Tensile Modulus (psi) | 2,013,000 |
| ASTM D695 | |
| Mean Compressive Strength (psi) | 22,530 |
| Mean Compressive Modulus (psi) | 734,000 |
| ASTM D790 | |
| Mean Flexural Strength (psi) | 6,515 |
| Mean Flexural Modulus (psi) | 1,960,000 |
| Glass Transition Temperature | 430° C. |

In the following examples a shear-type mixer was used to mix the resin (containing the promoter) and the filler. Generally, the mixing time of the resin and filler in the shear mixer is about 30 minutes. When one is ready to build the tool, the catalyst is added to the resin/filler mixture. The resin/filler/catalyst mixture is then applied to the pattern.

EXAMPLE 1

TOOLING HAND LAY UP PROTOCOL

1. Apply 25 to 35 mils of surface layer material on pattern.
2. While product is still wet, apply one layer of 6 ounce tooling mat.
3. After the 6 ounce tooling mat has been rolled out, and there are no air pockets, brush or spray 30 mils of backer layer material over complete surface area.
4. Apply one layer of 10 ounce tooling mat. (Wet out tooling mat before applying.)
5. Apply 30 mils of backer layer material.
6. Apply one layer of 10 ounce tooling mat. (Wet out tooling mat before applying.)
7. Apply 30 mils of backer layer material.
8. Apply one layer of 10 ounce tooling mat. (Wet out tooling mat before applying.)
9. Install steel frame in place. The stronger the frame, the better the finished tool. Use 2"×4" or 4"×4¼" wall frame. 4"×4"×¼" steel frame is recommended on large tools.
10. Set in place heating and cooling line (⅜" soft copper). Set lines approximately 1½" apart on 10 ounce tooling mat. Use backer material mixture to hold in place. Leave backer material to harden the cooling lines in place.
11. Apply 30 mils of backer material over lines and complete surface of laminate.
12. The tool is now approximately 0.250 to 0.300 inches thick.
13. Apply proper rotation of 10 ounce tooling mat and 30 mils of backer layer material until the tool reaches a thickness of one inch. Make sure the tooling mat on the frame is worked properly. Final laminate should be one layer of 10 ounce tooling mat.

EXAMPLE 2

SPRAY TOOLING SYSTEM

1. For gloss surface—use surface coat material.
2. Apply 30 to 40 mils of backer layer material.
3. Apply one layer of 6 ounce tooling mat. (Wet out tooling mat before applying. Let it set to a tacky feel.)
4. Apply 30 to 40 mils of backer layer material.
5. Apply one layer of 10 ounce tooling mat. (Wet out tooling mat before using.)
6. Apply 30 to 40 mils of backer layer material.
7. Apply one layer of 10 ounce tooling mat. (Wet out tooling mat before using.)
8. Apply 30 mils of backer layer material.
9. Apply one layer of 10 ounce tooling mat.
10. Add the proper frame in place along with 10 ounce tooling mat.

Repeat steps 3 through 10 to desired thickness.

EXAMPLE 3

CASTING TOOL PROCEDURE

Use same procedure as in Example 1 until the cooling or heating lines are in place. Then mass cast backer layer material to desired tool thickness. We recommend no less than 2" of casting material. Preferably, one layer of tooling mat is on back surface. Note: Casting of a mold could consist of spraying surface then suspending cooling line and casting backer at minimum of two inches but it can be casted thicker.

The tooling composites of the present invention are particularly useful in molding processes such as reaction injection molding, thermal injection molding, cold press molding, SMC molding, vacuum form molding, roto cast molding, open molding, resin transfer molding, autoclave molding, DCP molding, and vacuum infusion molding.

One skilled in the art will appreciate that many modifications to the above-preferred embodiments can be made. For example, any vinyl ester resin can be employed as long as it has a $T_g$ of about 400° C. Also, different fillers can be used with the present invention. For example, in the backer layer any filler can be used as long as it is irregularly shaped (non-crystalline) and porous. Preferably, the filler particles for the backer layer are not in platelet or needle form. Therefore, it is intended that the invention not be limited by the foregoing description, but only by the claims which follow.

I claim:

1. A durable, high temperature tooling composition comprising vinyl ester resin, from about 70% w/w to about 90% w/w tabular alumina, a promoter, and a catalyst.

2. A durable, high temperature tooling composition comprising vinyl ester resin, a filler system of particulate fillers, a promoter, and a catalyst, wherein said composition has a $T_g$ of at least 315° C. when cured.

3. The composition of claim 2, wherein the filler system comprises tabular alumina.

4. The composition of claim 3, having about one part w/w vinyl ester resin and about 3.5 parts w/w tabular alumina.

5. The composition of claim 2, wherein the filler system comprises a base nickel alloy and fumed silica.

6. The composition of claim 5, having about one part w/w vinyl ester resin, about four parts w/w base nickel alloy, and about 10% w/w fumed silica.

7. The composition of claim 6, wherein the base nickel alloy comprises chromium, manganese, and vanadium.

8. The composition of claim 7, wherein the base nickel alloy further comprises carbon, cobalt, iron, molybdenum, silicon, and tungsten.

9. The composition of claim 8, wherein the nickel is about 53.16% w/w, the carbon is about 0.02% w/w, the cobalt is about 0.44% w/w, the chromium is about 16.79% w/w, the iron is about 6.24% w/w, the manganese is about 0.69% w/w, the molybdenum is about 16.97% w/w, the silicon is about 0.74% w/w, the tungsten is about 4.65% w/w, and the vanadium is about 0.30% w/w.

10. A durable, high temperature molding tool having the composition of claim 4.

11. A durable, high temperature molding tool comprising a surface layer having the composition of claim 6.

12. A durable, high temperature molding tool comprising a surface layer having the composition of claim 9.

13. A durable, high temperature tool comprising a surface layer having the composition of claim 9 and a backer layer having a second composition of about one part w/w vinyl ester resin, about 3.5 parts w/w tabular alumina, a promoter, and a catalyst, wherein said second composition has a $T_g$ of at least 315° C. when cured.

14. In a process for molding plastic parts, the improvement comprising forming the part using the tool of claim 10.

15. In a process for molding plastic parts, the improvement comprising forming the part using the tool of claim 11.

16. In a process for molding plastic parts, the improvement comprising forming the part using the tool of claim 12.

17. In a process for molding plastic parts, the improvement comprising forming the part using the tool of claim 13.

18. An improved apparatus for molding plastic parts, wherein the improvement comprises a mold cavity having the tool of claim 10.

19. An improved apparatus for molding plastic parts, wherein the improvement comprises a mold cavity having the tool of claim 11.

20. An improved apparatus for molding plastic parts, wherein the improvement comprises a mold cavity having the tool of claim 12.

21. An improved apparatus for molding plastic parts, wherein the improvement comprises a mold cavity having the tool of claim 13.

* * * * *